(12) United States Patent
Joannis et al.

(10) Patent No.: US 8,162,258 B2
(45) Date of Patent: Apr. 24, 2012

(54) REST MODULE WITH A FIRST PARTIAL MODULE WITH DIRECT ACCESS TO A POSSIBLE SECOND PARTIAL MODULE

(75) Inventors: Gilles Joannis, Leguevin (FR); Kathrin Voelkner, Blaubeuren (DE); Yannick Chourreau, Montberon (FR); Martin Geldien, Laupheim (DE); Dejan Golubovic, Hamburg (DE)

(73) Assignees: Airbus Operations GmbH (DE); Airbus Operations SAS (FR)

( * ) Notice: Subject to any disclaimer, the term of this patent is extended or adjusted under 35 U.S.C. 154(b) by 154 days.

(21) Appl. No.: 12/743,645

(22) PCT Filed: Nov. 14, 2008

(86) PCT No.: PCT/EP2008/065543
§ 371 (c)(1),
(2), (4) Date: May 26, 2010

(87) PCT Pub. No.: WO2009/065772
PCT Pub. Date: May 28, 2009

(65) Prior Publication Data
US 2011/0057073 A1 Mar. 10, 2011

Related U.S. Application Data

(60) Provisional application No. 61/003,744, filed on Nov. 20, 2007.

(30) Foreign Application Priority Data

Nov. 20, 2007 (EP) .................................... 07022520

(51) Int. Cl.
*B64D 11/00* (2006.01)

(52) U.S. Cl. .................................. 244/118.6; 244/118.1
(58) Field of Classification Search ............... 244/118.2, 244/118.5, 118.6, 120
See application file for complete search history.

(56) References Cited

U.S. PATENT DOCUMENTS

| | | | | |
|---|---|---|---|---|
| 5,784,836 | A | * | 7/1998 | Ehrick ....................... 244/118.5 |
| 6,073,883 | A | | 6/2000 | Ohlmann et al. |
| 6,152,400 | A | * | 11/2000 | Sankrithi et al. ........... 244/118.6 |
| 6,182,926 | B1 | | 2/2001 | Moore |
| 6,305,645 | B1 | | 10/2001 | Moore |

(Continued)

FOREIGN PATENT DOCUMENTS

DE 69923925 T2 3/2005

(Continued)

*Primary Examiner* — Tien Dinh
*Assistant Examiner* — Richard R Green
(74) *Attorney, Agent, or Firm* — Lerner, David, Littenberg, Krumholz & Mentlik, LLP

(57) ABSTRACT

The invention relates to a rest module for accommodating a least one crew member of an aircraft, wherein the module comprises a first partial module. Further on the first partial module comprises a first section and a second section; wherein the first section and the second section are spatially divided. The first section comprises a first opening, a second opening and a third opening, wherein the three openings are different from each other. The first opening is adapted for providing an access from an above located area of the aircraft, the second opening is adapted for providing an access from the first section to a second partial module and the third opening is adapted for providing a separate access from the first section to the second section.

15 Claims, 8 Drawing Sheets

U.S. PATENT DOCUMENTS 6,520,451 B1   2/2003   Moore
2006/0284013 A1*  12/2006   Guering ..................... 244/118.6

FOREIGN PATENT DOCUMENTS

| EP | 0035955 | A2 | 9/1981 |
| EP | 0514650 | | 11/1992 |
| EP | 0901963 | A2 | 3/1999 |
| EP | 0901964 | A2 | 3/1999 |
| EP | 1010617 | A2 | 6/2000 |
| WO | 9614243 | A1 | 5/1996 |
| WO | 2006028999 | A2 | 3/2006 |

* cited by examiner

REST MODULE WITH A FIRST PARTIAL MODULE WITH DIRECT ACCESS TO A POSSIBLE SECOND PARTIAL MODULE

CROSS-REFERENCE TO RELATED APPLICATIONS

This application is a national phase entry under 35 U.S.C. §371 of International Application No. PCT/EP2008/065543, filed Nov. 14, 2008, published in English, which claims the benefit of the filing date of European Patent Application No. EP 07 022 520.6 filed Nov. 20, 2007 and of the U.S. Provisional Patent Application No. 61/003,744, filed Nov. 20, 2007, the disclosures of which applications are hereby incorporated herein by reference.

TECHNICAL FIELD

The present invention relates to a rest module, the use of a rest module in an aircraft and an aircraft comprising a rest module.

BACKGROUND OF THE INVENTION

Today's commercial aircraft cabins are designed to accommodate crew members in special rooms. More precisely such rooms may be designed as so-called crew rest compartments or rest modules which belong, according to statutory provisions, to the mandatory equipment of airplanes for long distance flights. Therefore, according to international standards for long distance flights, for flights with a time duration of 8 to 14 hours there may be a need for one arrangement to lay down and for flights with more than 14 hours two arrangements to lay down are needed. This is caused by the requirement, that by exceeding a certain time duration of the flight there must be two entire flight crews on board of the airplane.

It shall be noted, that the term crew rest compartment and crew, always may consider the flight crew of an aircraft as well as the cabin crew of an aircraft. This of course does not exclude, that other persons may use the inventive rest module.

During the recent years the security demands in airplanes have been increased rapidly, which also includes the securing separation of the cockpit area from the passenger area. From a constructing point of view it might therefore be desirable that the flight crew has a direct spatial access to such a flight crew rest compartment (FCRC) from the cockpit area, without the need to cross the passenger area. Beyond this, security requirements like for example being fireproof or bullet-proof may arise or be important for the construction of such crew rest compartments.

Today's commercial flight crew rest compartments are realized in the ceiling area, the so-called crown area of the airplane with two adjacent sleeping arrangements. In most of these realizations the flight crew has to pass a certain way in order to reach the flight crew rest compartment. On the one hand the habitation area in the inner side of these compartments is commonly very narrow and on the other hand the following passenger area for example the so-called first class area is commonly very commodious and spatially wide. Such a first class area may eventually not offer the full technical height over the whole area. That may further mean, that a CRC (crew rest compartment) can optically influence the appearance of the cabin design.

Further on known solutions of crew rest compartments or flight crew rest compartments do not provide a spatial division or separation between different cabins for single crew members and are therefore not optimally designed in the sense of room and space configuration. The privacy may therefore not be provided during a rest session of an user.

In the past any solutions for CRCs or FCRCs provided two sleeping arrangements. Because the crew is joined by a second pilot in only 70 to 80% of the flights, the second bed and all its appropriate components may be transported unnecessarily. The second bed may require a lot of storage or loading space which volume may be urgently needed in airplanes. Further on the additional fraction of the weight of the airplane has just now to be avoided during times, when wide body airplanes become more important.

In difference to the solutions for the flight crew the compartments of the cabin crew are for example arranged at the rear end of the airplane. With this configuration of the two compartments there normally arises the need for two different ladders or aids in ascending.

In recent times where the reduction of the emission of exhausts becomes more and more important additional mass, volume and components especially in crew rest compartments should be avoided.

SUMMARY OF THE INVENTION

It is an object of the invention to provide an improved crew rest in an aircraft.

The object may be solved by a rest module, by a use of a rest module in aircraft and by an aircraft which comprises a rest module according to the independent claims.

According to an exemplary embodiment of the invention, a rest module for accommodating at least one crew member of an aircraft is provided. The rest module comprises a first partial module, wherein the first partial module comprises a first section and a second section. Further on the first section and the second section are spatially divided and the first section comprises a first, a second and a third opening. These openings are different from each other. The first opening is adapted for providing an access from an above-located area of the aircraft, wherein the second opening is adapted for providing an access from the first section to a second partial module. The third opening is adapted for providing a separate access from the first section to the second section. Furthermore the first partial module is permanently fixed in an electronic bay before a cargo wall of the aircraft, and the second partial module is located behind the cargo wall.

In principle the electronic bay (which is also called e-bay) provides for the electronic power of the aircraft and the electronical controlling systems, the so called aircraft intelligence. Also segregated power supplies (PEPDC and SEPDC) and different equipment like several batteries, relay box, sensing and measurement units like e.g. horizontality measurement units are installed in the e-bay. Also temperature, speed and pressure may be measured. Also harnesses and ventilation pipes may be present in the e-bay.

According to security requirements the electronic bay of an aircraft must be supplied with two identical avionic bays. Each of these two segregated systems may comprise an electrical equipment box with all calculators and IT stuff necessary for the aircraft. In case of a damaged first avionics bay the second avionics bay may provide the aircraft with the necessary functions. Further security requirements demand a minimum distance between these two identical electronical and IT systems.

According to this exemplary embodiment of the invention the space between this first and second avionics bay is used in a space saving way. Furthermore the housing of the rest modules comprising or being the outer walls of the rest module may be constructed in such a way, that is may be used as protection element between the first and second avionics bays. In case of e.g. a fire or an explosion in the required distance area between the two avionics bay, the presence of the rest module may securely protect the electronical components. Therefore the rest module may comprise e.g. fireproof walls, bullet proof walls or explosion resistant walls or any combination of these.

Thus by means of installing the first partial module into the nearly unused area between the two avionic bays in the e-bay, the use of expensive revenue space for accommodating the crew members may be avoided. Furthermore the security of the whole aircraft is increased, as the aircraft intelligence and electronical power centre of the aircraft is protected in an enhanced way.

The terms "first and second sections" of the exemplary embodiments of the present invention may also be divisions, areas, or spatial rooms that fulfil the requirement, that the first and second section are spatially divided. This spatial division means, that potential users of the first partial module that are situated in the two different sections do not get any sonic, visual or mechanical hint of the presence of the other user in the first partial module. This might be arranged due to a separation wall that is soundproof, optically not transparent and may also separate the two divisions from smells or exhalations.

This spatial division of the first and second section of the first partial module causes the effect or advantage, that an incoming first person does not disturb a potential second person, that is simultaneously using the second division of the first partial module. That means that the spatial division is arranged and has to be arranged in such a way, that a first user in the second section of the first partial module can follow all his wanted activities without being disturbed in any way by a person entering the first section of the first partial module.

The three inventive openings of the first section are different from each other and may also be seen as apertures, holes, ports, doors and all mechanical arrangements that allow people to have access through these inventive openings.

The openings may thereby be arranged as common doors, that provide access from the first section of the first partial module to the second section, to a second partial module and to an above-located area of the aircraft. The first opening, which connects the level of the module with the above-located level of the aircraft may be realized for example as a sliding door, a hatch, an emergency exit hatch, as a flapping mechanism or for example as a mechanical port realizing an entry for the module users.

The above-located area of the aircraft may therefore be any section of the upper deck along the longitudinal axis. This may be the cockpit, an area with the crew rest compartment, the passenger area, or especially the crown area of the airplane.

As it is later on shown (for example in FIG. 1) the second opening which is adapted for providing an access from the first section to a second partial module can for example be a door that allows a user to reach a possible second partial module that is arranged on the same level as the first partial module without disturbing the intimacy or privacy of a potential user in the second section of the first partial module. This separate and direct access from the first section to a second partial module causes the technical effect, that no other staircase or aid in ascending or descending is needed for all the users of the inventive module by simultaneously realizing the advantage of not disturbing other users.

The third opening which can for example be realized as a door in the spatially dividing wall between the first and the second section is providing a separate access from the first section to the second section. This causes the advantage, of using only one staircase while ascending or descending to or from an above-located area of the aircraft for all users, but not causing any influence of the usage of all the second sections of the inventive module.

As this exemplary embodiment of the invention may be capable to be docked on a second partial module or capable for docking on at a second partial module the invention realizes a connection of two crew rest compartments or flight crew rest compartments on one level. The first partial module is thereby fixed entirely on this level wherein the second partial module or more additional partial modules may be added as dock-on modules. This exemplary aspect of the invention offers an increase of flexibility of such compartments and may reduce the required space of the module on the cabin deck or so-called upper deck.

According to a further exemplary embodiment of the invention the first and the second partial modules are adapted for being mounted on a cargo level of the aircraft.

The two partial modules (or more additional partial modules) may be mounted and fixed at the ground of the cargo level and therefore be treated and handled like typical cargo containers. This causes advantages in the required space for the rest module on the main deck, the advantage of a flexible handling of the partial modules on the cargo level of the aircraft and further on the advantage, that the shape and the physical form of the partial modules may not fulfil the requirements that exist for crew rest compartments on the main deck. This may lead to constructing advantages for the building engineers, which do not have to plan the rest module with the limitations or requirements of optical, mechanical and designing aspects of the crew rest compartment.

This may also contain the possibility to easily dock-on a second partial module at the first partial module that is fixed on the cargo level during all the time. This docking-on process may be going on much faster, easier and with less energy and working effort as it would have been if this configuration would have been placed on the main deck. This docking-on process might be supported by special cargo transport belts with which the mobile module can be situated at its appropriate position.

According to a further exemplary embodiment of the invention, the first partial module is adapted for docking-on the second partial module.

In difference to other exemplary embodiments where the second partial module may be located in a distinct distance to the first partial module it may also be possible to link the first and the second partial module mechanically together. This might be realized in a first way, where the first partial module and the second partial module might be placed adjacent to each other by the fixation of each module is done separately in each module for example by fixing each module to the ground of the level for example the cargo level. But also a second possibility is given herewith wherein both partial modules offer a common element which mounts the two modules physically and mechanically together. This dock-on possibility creates a pool of advantages in a sense of flexibility, required space, avoiding additional weight of the airplane and therefore avoiding additional exhausts of the airplane and offering more needed space for especially additional cargo.

This docking on variation of the invention may also be possible for additional partial modules.

According to a further exemplary embodiment of the invention, the rest module further comprises a connecting element, wherein the connecting element is adapted for docking-on the second partial module at the first partial module or at the cargo wall.

This connecting element may offer additional stability for the first and the second partial modules while they are simultaneously anchored or fixed on their ground level. But also a sole fixation of the two modules against each other is possible through this connecting element. Each mechanical apparatus, device or mechanism that provides a fixing connection between the first and the second module may fulfil the requirements for the here defined connecting element. For example may a screwing or riveting fixation be realized.

In other words it is possible, that the first partial module is docked on to the cargo wall with a first connecting element and the second partial module is docked on to the cargo wall with a second connecting element. Thus, the two modules may be separated from each other by the cargo wall. This exemplary embodiment of the invention also comprises, that the two modules may laterally be shifted against each other. This may be used for special space saving configurations if the first and the second partial module.

According to a further exemplary embodiment of the invention the above-located area of the aircraft is the cockpit of the aircraft.

This means, that the rest module of the present invention is directly or nearly directly located underneath the cockpit area on the cargo level. This might for example be seen in the FIG. 11.

This also means that the inventive rest module would then be called a flight crew rest compartment as it offers the possibility of the flight crew to directly enter the inventive module from the cockpit area if a second door (as privacy door) between Lavatory and Galley is installed. This offers the advantages that the paths and times a flight crew member needs in average to get to his rest module is therefore minimized and optimized. This solution offers also the possibility to shape the whole unity of cockpit and appropriate rest module for the flight crew has one entire and spatially completed, mechanical unit. In times of higher terroristical potentials the security requirements of the area where the flight crew spends their hole time during the flight must securely be separated from that part of the airplane that can be entered by unauthorized persons.

This exemplary embodiment also corresponds to the need or demand of a flight crew rest compartment, that normally it has to offer one sleeping arrangement or resting arrangement but can be easily upgraded with a module for the flight crew. Then two sleeping arrangements may be offered in the case of having two entire flight crews on board.

Further on this exemplary embodiment of the invention realizes the possibility for the flight crew to directly enter the rest module without having the need to pass the eventually unsafe area of the passengers or the cabin crew. Therefore, the inventive rest module and the accompanied cockpit deliver all services, facilities and devices that are needed for the flight crew during the whole flight time. This means in a sense of independency that the flight crew may be totally autarkic or self-sufficient in its cockpit area and connected rest module.

According to a further exemplary embodiment of the invention, each of the partial modules comprises a sleeping accommodation.

This sleeping accommodation which is also expressed by the words sleeping arrangement, resting possibility or bed is needed to fulfil the legal requirements of the sleeping equipment for a cockpit crew depending on its flight duration. Sleeping accommodation may be realized through various different embodiments wherein a bed, a pallet, a foldable plate or a couch are possible embodiments.

According to a further exemplary embodiment of the invention, the first section comprises an aid in ascending.

As the inventive rest module offers a first opening which provides access from an above located area of the aircraft, this area can be reached by the aid in ascending. This expression of course does not exclude the possibility that this aid might also be used for descending down to or into the module. Depending on the height or the level where the module is used in the airplane the aid might be leading into the crown area of the airplane or more commonly onto the main deck of the airplane especially into the cockpit.

According to a further exemplary embodiment of the invention, the first module comprises an integrated staircase.

This integrated staircase may also be realized as a so-called vestibule or also as a stairway or a well. Also simple stairs which allow a user to ascend or descend out of the module or into the module are possible solutions of the aid in descending which is integrated in the integrated staircase. In contrary to common solutions this exemplary embodiment offers a direct but separate access to both compartments.

According to a further exemplary embodiment of the invention, the rest module comprises at least one additional partial module, wherein the second opening is further adapted for providing an access from the first section to the at least one additional partial module.

As later on shown for example in FIG. 6 and FIG. 7 this embodiment may consist of various different rest modules that might be docked on the first partial module or may also be placed in a distinct distance to the first partial module. The most important core idea of this embodiment of the invention is that all partial additional modules can be reached direct and separately from the first section of the first and fixed partial module. This exactly means, that the user who wants to use one of the additional modules is entering the first partial module through the first opening and climbs down by using the aid in descending. Having arrived at the first section of the first partial module the potential user has the choice to firstly enter the second section or (by using the second opening) getting access and this means direct access without having the need to disturb other users to the wanted partial additional module. None of the potential users that are simultaneously present in other partial additional modules are disturbed by any activity or entering process of a different user. This offers a high level of privacy and intimacy of the crew members or flight crew members.

As all of these additional partial modules can be arranged as dock-on modules it is also possible to form one mechanical unity out of the first partial module and the other additional partial modules. This mechanical unity might then be placed on the cargo level of the aircraft and therefore decrease the used space and volume for accommodating the crew on the main deck.

According to a further exemplary embodiment of the invention, at least one of the partial modules is shaped as a conventional cargo container.

This form solution of at least one of the partial modules may create a few advantages concerning the requirements of the physical shape, the material and the handling of the rest modules. This means for example that the partial module does not have to be optically attractive, as it is not presented to the passengers. Further on this may lead to a better integration of the module on the cargo level, as the cargo container shaped modules may fit physically better in their cargo surrounding. This may further on create more storage space or freight hold on the cargo level.

According to a further exemplary embodiment of the invention the first partial module is part of a flight crew security area.

As the first partial module is located in the electronic bay which is located close to nose of the aircraft the rest module is close to the cockpit. Due to higher security standards for the flight crew a special flight crew security region may be compulsory within the aircraft. The installation of the first partial module into the area between the cargo wall and the region of the nose landing gear allows technically to insert the first partial module in such a special flight crew security region. It might thus be possible to build a complete mechanical unit by the shown first partial module and the above located cockpit with maybe further elements like e.g. lavatories. Thus a short and safe way for the flight crew into the first partial module in the electronic bay can be realized. Thereby a flight crew member does not need to leave this spatially divided and secure flight crew area on his way to the electronic bay.

According to a further exemplary embodiment of the invention, the use of a rest module according to one of the exemplary embodiments in an aircraft is provided.

According to a further exemplary embodiment, an aircraft is provided which comprises a rest module according to one of the exemplary embodiments.

The exemplary embodiments of the module are also valid for the use of a module in an aircraft as well as for an aircraft comprising such a module.

BRIEF DESCRIPTION OF THE DRAWINGS

In the following, exemplary embodiments of the present invention will be specified for further explanation and for better understanding with reference to the attached drawings.

DETAILED DESCRIPTION OF THE PREFERRED EMBODIMENTS

Figure 1:
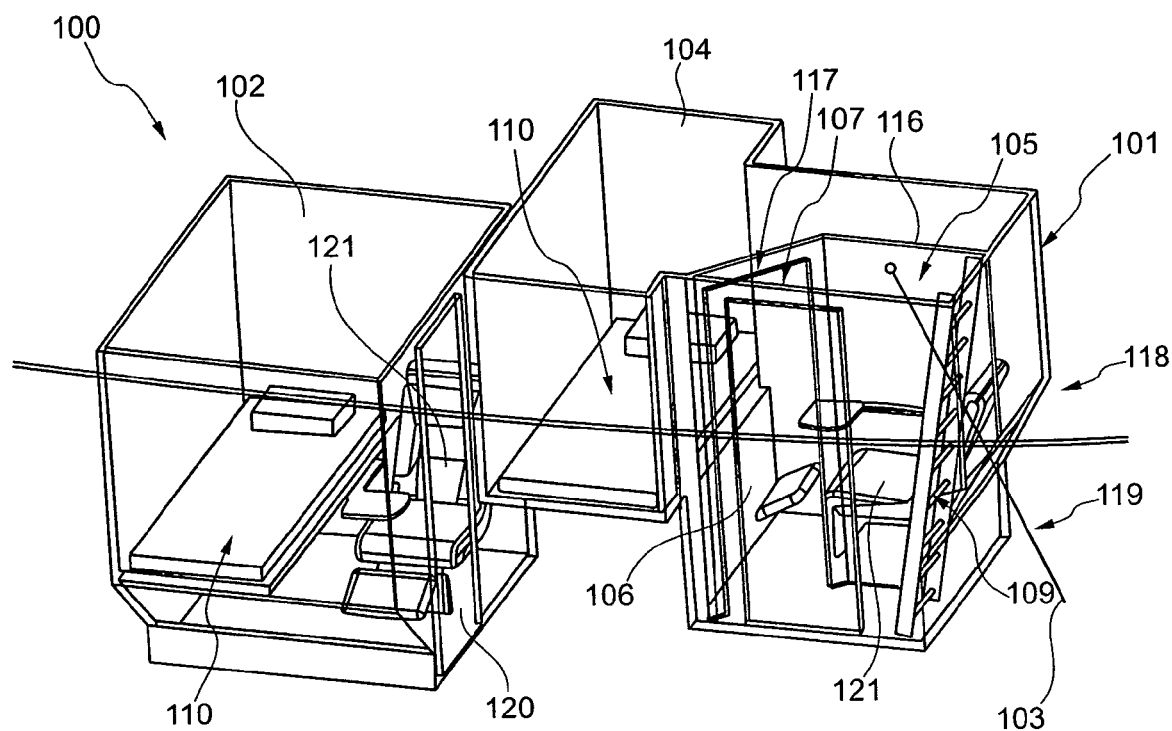
FIG. 1 shows a schematic view of an exemplary embodiment of the rest module with a second partial module according to an exemplary embodiment of the present invention.

Similar or relating components in the several figures are provided with the same reference numerals. The view in the figure is schematic and not fully scaled.

Figure 2:
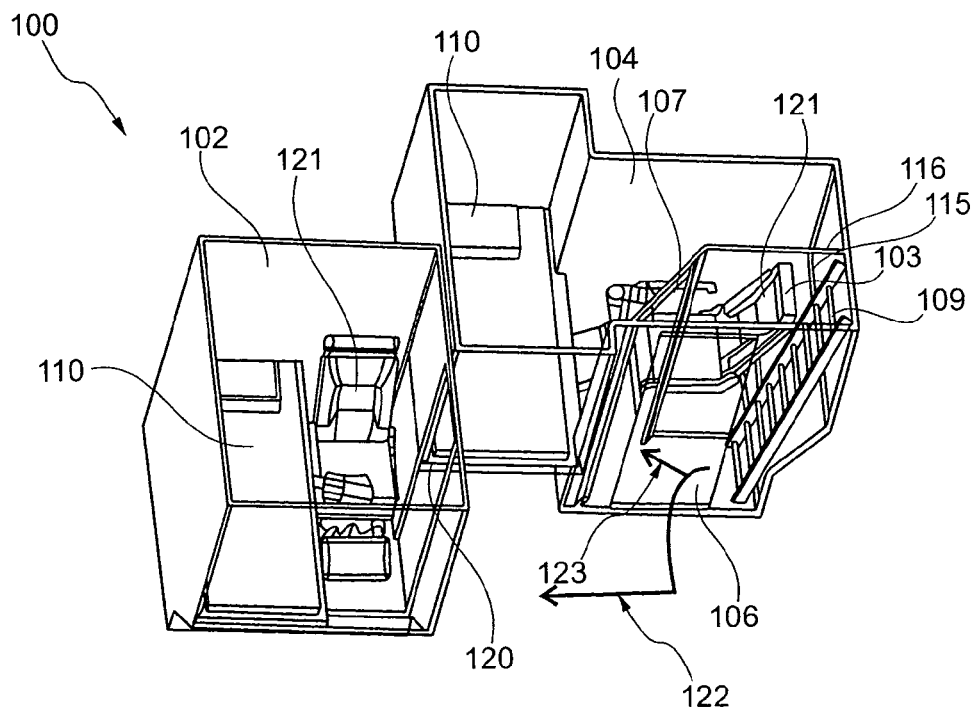
FIG. 2 shows a schematic view of an exemplary embodiment of the rest module with a second partial module according to an exemplary embodiment of the present invention.
Figure 4:
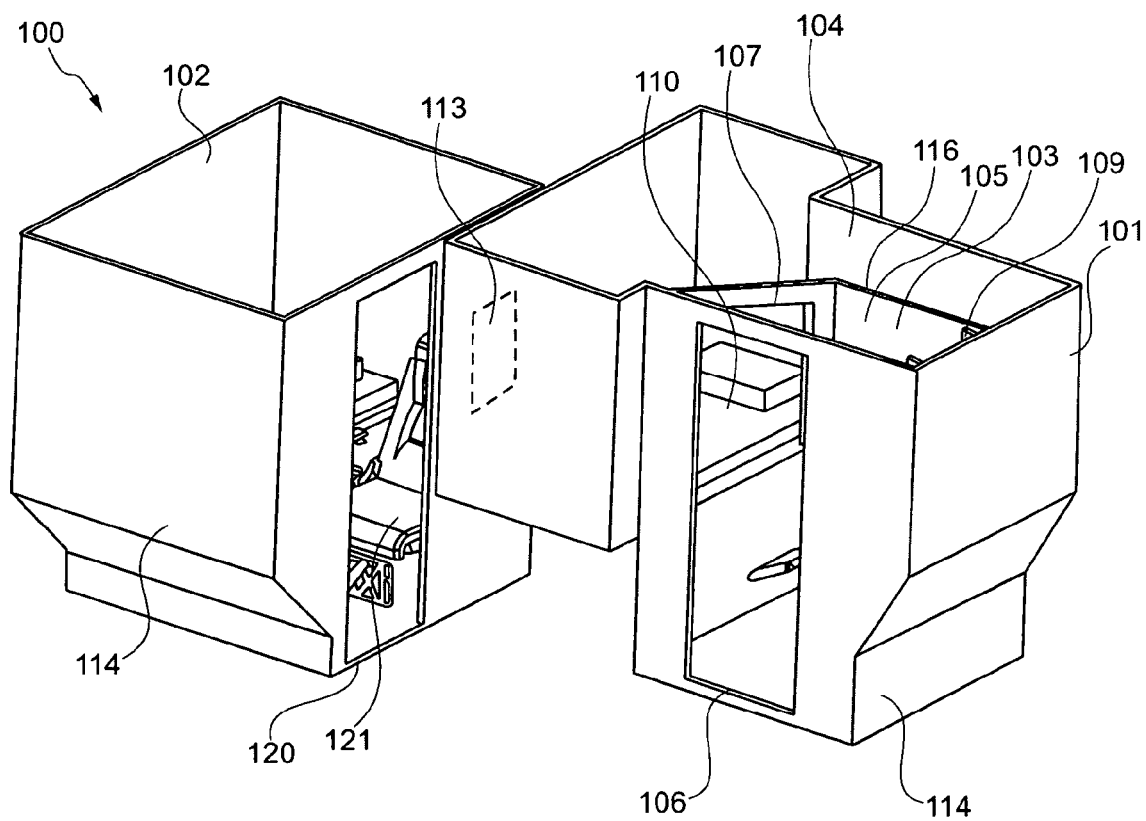
FIG. 4 shows a schematic view of an exemplary embodiment of the rest module with a second partial module according to an exemplary embodiment of the present invention.

FIGS. 1, 2 and 4 illustrate schematic views of exemplary embodiments of the present invention. A shown rest module 100 comprises a first partial module 101 and a second partial module 102, while the first partial module is spatially divided by a wall 116. This wall creates a first section 103 and a second section 104. The wall 116 further on offers a door 117 that guarantees an access from the first section of the first partial module into the second section. All together the first section comprises three openings, the first opening 105, the second opening 106 and the third opening 107. The first opening 105 is an opening that leads to an above-located area of the aircraft 108. This area is only indicated by the floor of the above-located area 118. The first opening 105 therefore is an opening in the floor of the above-located area 118 and leads to this upper area. For example, might this upper area be the cockpit area, other part of the main deck. The shown level of the rest module 119 might therefore be the cargo level or can also be (in special embodiments of the invention) the main deck.

As clearly shown in FIG. 1 the second opening 106 provides a direct and separate access from the first section of the first partial module to a second partial module 102. This second opening 106 can also be realized as a conventional door, but also a simple hole in this outer wall of the first partial module 101 will be a sufficient solution for providing this access. As one can further clearly see the second partial module 102 provides also an opening to enter the second partial module. This opening 120 might also be realized with a conventional door that can be closed in order to provide enough intimacy and privacy for the second user.

The first partial module (101) may further be permanently fixed in the electronic bay before the cargo wall and the second partial module (102) may be located behind the cargo wall.

Furthermore it may be seen, that the rest module (100) may serve as mechanical bearer between the floor of the electronic bay and the above located floor of the main deck, which increases the mechanical stability of that region of the aircraft. Thus the rest module may be integrated in the e-bay as a structural element of that aircraft region, wherein the rest module at least intercepts a few percents of the loads, being present in that region of the aircraft region. In other words the rest module may be adapted to intercept not circumstantial loads within the e-bay.

As it can be seen in all three figures FIG. 1, FIG. 2 and FIG. 4, each partial module comprises a sleeping accommodation 110 in order to provide enough recreation and habitation facilities for the crew members. By adding seating facilities like chairs 121 into the partial modules the comfort is raised.

As one can see all three openings 105, 106 and 107 are different from each other, and are further on working independently from the state of each other opening.

As one can clearly see in FIG. 2, the inventive rest module that might be placed on a cargo level of the aircraft provides a direct and separate access 122 to the second partial module 102 and a direct and separate access 123 to the second section by using only one and the same aid in ascending 109.

FIG. 4 shows an exemplary embodiment of the inventive rest module 100. Thereby the rest module 100 comprises a first partial module 101 and a second partial module 102 wherein the first partial module is divided into a first section 103 and a second section 104. This division is realized by a wall 116 that offers the third opening 107 of the first partial module. The other two openings 105 and 106 are shown clearly.

FIG. 4 also shows the connecting element 113 that mechanically contacts the two partial modules together. Further on one can clearly see that the first and second partial modules are shaped as a conventional cargo container 114. One can imagine, that a person that wants to enter the inventive module might use the first opening 105 that allows access from an above-lying section via a ladder, via a staircase or via single steps 109. As the two paths, one going from the first section to the second partial module and one going from the first section into the second section through the third opening 107, direct and separate access for the two different users of the two different modules is guaranteed.

Figure 3:
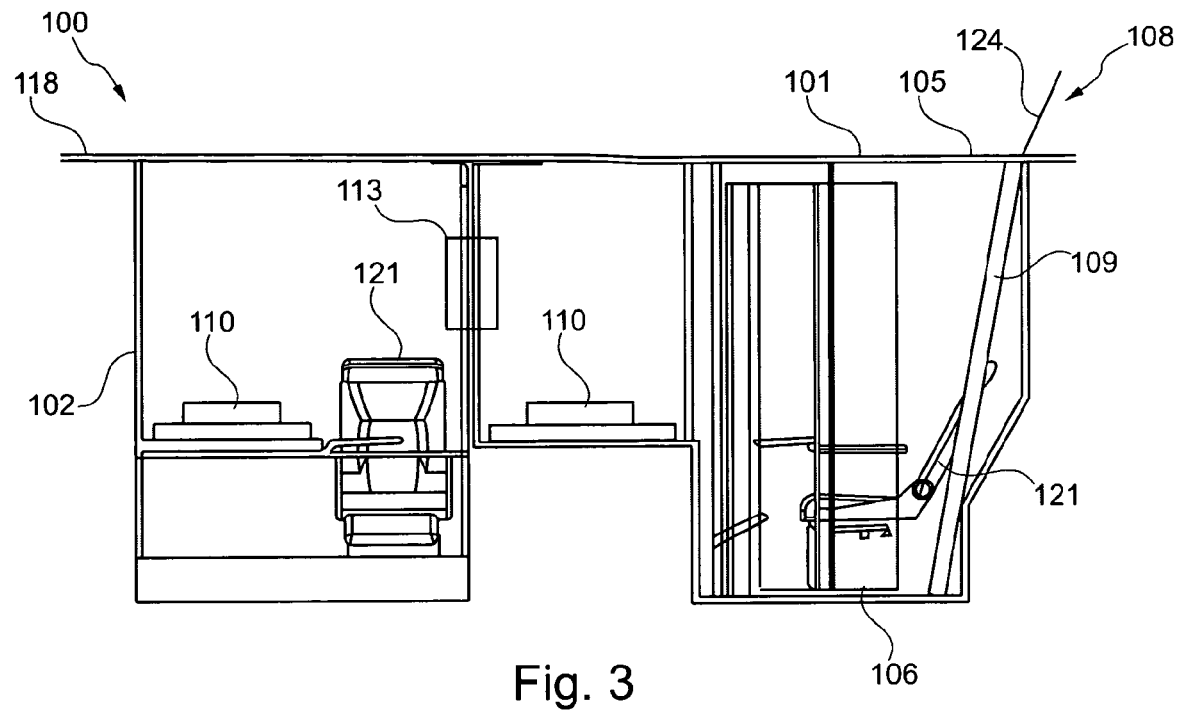
FIG. 3 shows a schematic view of an exemplary embodiment of the rest module with a second partial module according to an exemplary embodiment of the present invention.

FIG. 3 shows a side view of an exemplary embodiment of the inventive rest module. The first opening 105 is shown with a flap mechanism 124 to be able to close the first opening against the above-located area of the aircraft 108. As one can clearly see in this side view perspective, a part of the first partial module 101 where a sleeping arrangement 110 is arranged is on a slightly higher level positioned compared to the rest of the first module. Also the second module 102 is arranged on the same level as the first partial module 101. The two modules may be combined with a connecting element 113 that fixes those two modules to one mechanical unity also includes that the two modules are screwed together or are riveted together.

Figure 5:
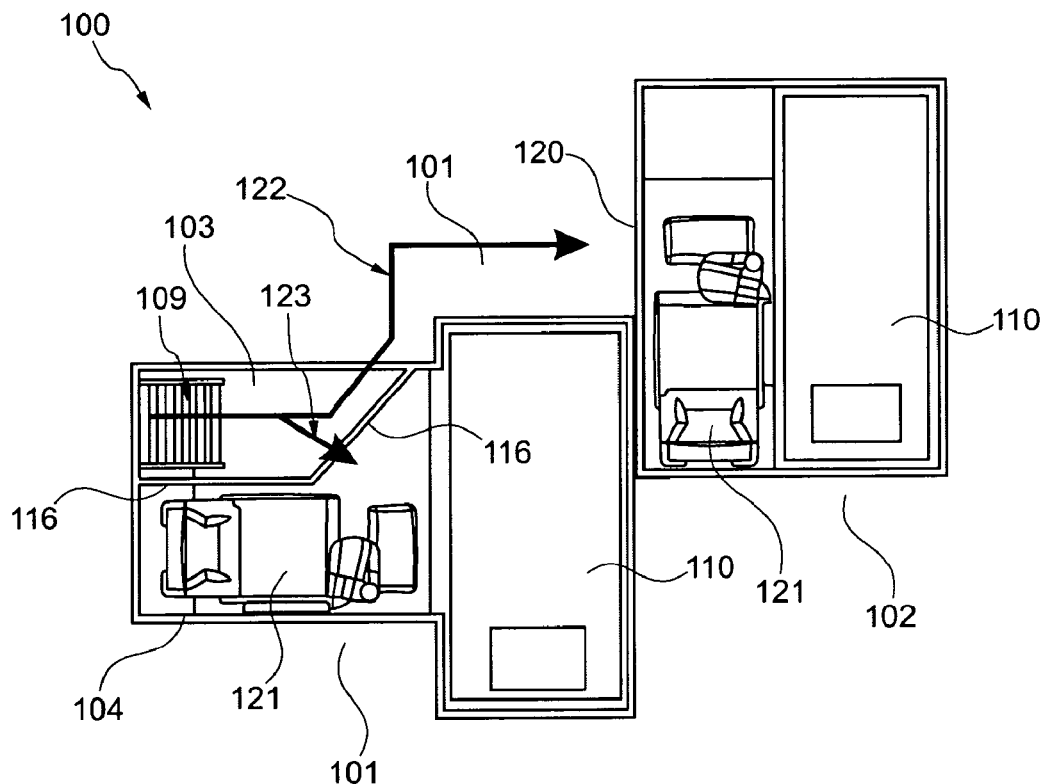
FIG. 5 shows a schematic top view of an exemplary embodiment of the rest module with a second partial module according to an exemplary embodiment of the present invention.

FIG. 5 shows an exemplary embodiment of the inventive rest module including a second partial module 102. In this top view perspective the innovative and inventive solution of direct and separate access from the entry of a flight crew rest compartment can be seen at the position of the aid in descending 109 with its two access possibilities 122 and 123. By having the first section 103 divided by a wall 116 from the second section 104 it is guaranteed, that an entering or passing user does not disturb privacy of the users in the modules 101 and 102. Furthermore the first partial module may be permanently fixed in the electronic bay of the aircraft and before a cargo wall (not shown). The cargo wall is situated between the first partial module (101) and the second partial module (102), as the second partial module is located behind the cargo wall. As this configuration might for example be installed on the cargo level of an aircraft there might also be additional access into the conventional cargo space. It is also possible, that the area which is located above this inventive rest module may be the cockpit area of the flight crew. Therefore it can be guaranteed, that a complete flight crew can have access to their entire and complete flight crew rest compartment without having to pass the public area of the passengers. These advantages are provided with the only one aid in descending and ascending 109.

Figure 6:
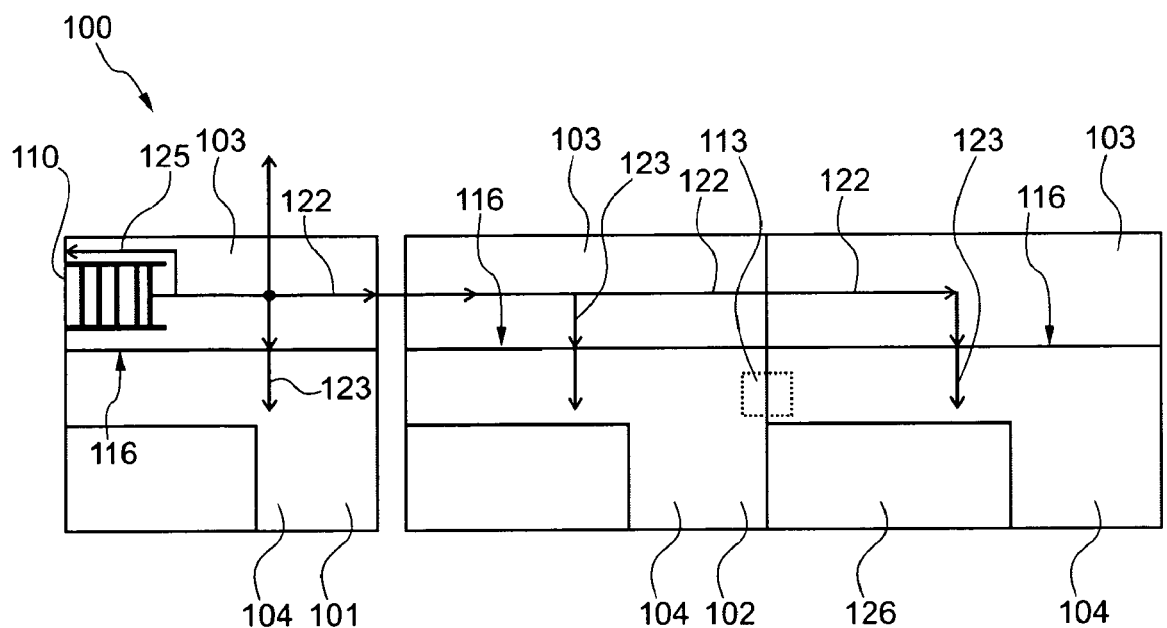
FIG. 6 shows a schematic top view of an exemplary embodiment of the rest module with a second and third additional partial module according to an exemplary embodiment of the present invention.

FIG. 6 shows a further exemplary embodiment of the inventive module in a second top view. Thereby are shown three partial modules, the first partial module 101, the second partial module 102 and for example a third partial module 126. This does not mean that the amount of additional modules is limited to a number of three. This configuration for example might be complemented by unlimited other first partial modules. It is also clearly seen that two different fixing configurations are shown. Module 101 and module 102 are not fixed entirely together and rather show a distinct distance between their physical bodies. In contrary to that module 102 and module 103 are linked together by the connecting element 113.

As a further characteristic feature of this exemplary embodiment one can clearly see that each module exhibits or comprises a division into a first section 103 and a second section 104. This is done and realized by a separating wall 116 that is shown in each of the three modules. This creates a public area in each partial module to provide different access possibilities for a locomotion from one partial module to another or from one partial module to other possible areas of that aircraft level. This access to possible areas of that aircraft level 125 and the direct but separate access to the additional partial modules 102 and 103 which access 122 is shown and indicated by arrows. Further on the direct and separate access to each second section which is the private and intimacy section of each module is indicated by the arrows 123. The cargo wall (not shown) would span along the first partial module (101) and the second partial module (102).

Figure 7:
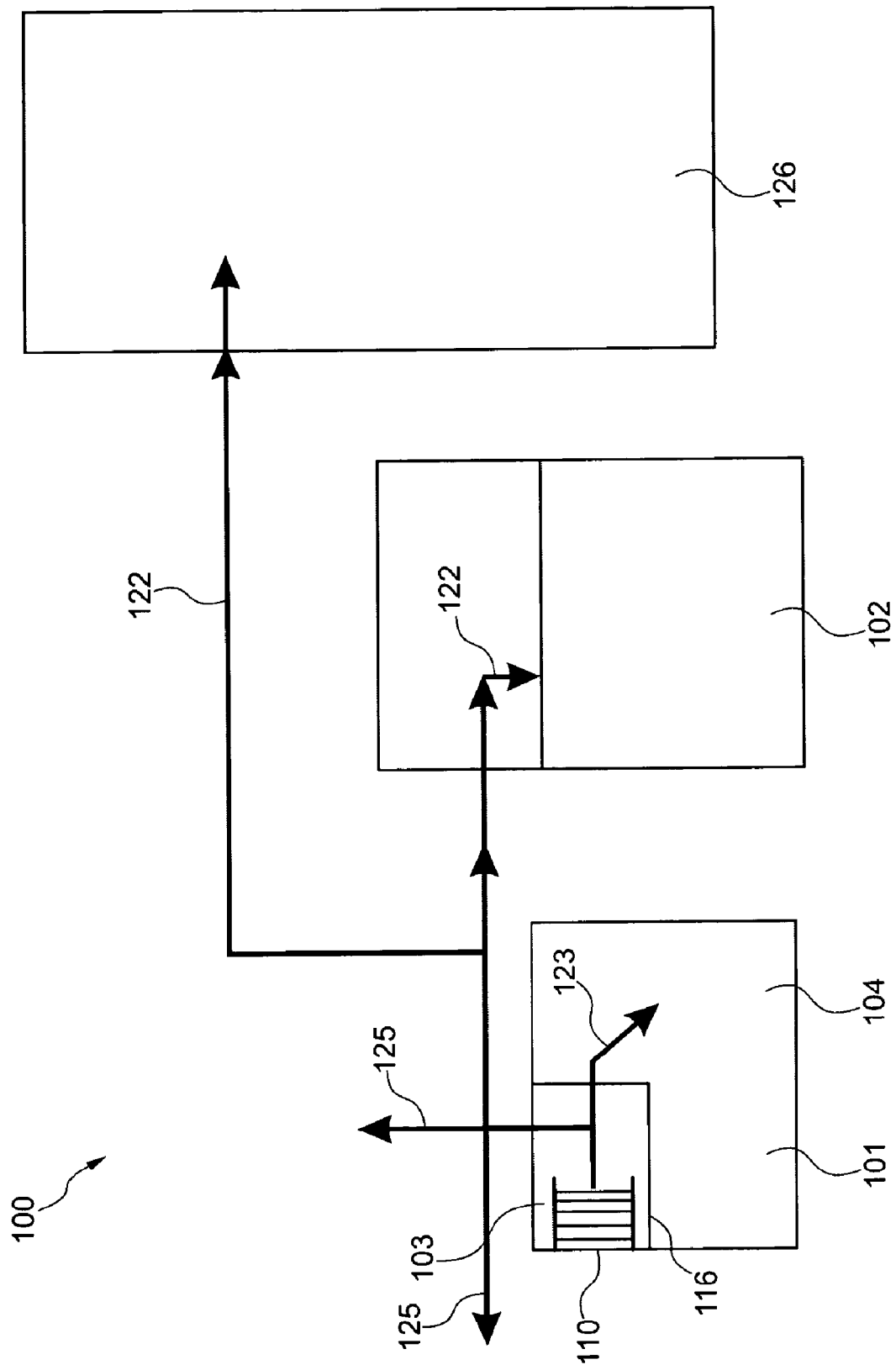
FIG. 7 shows a schematic view of an exemplary embodiment of the rest module with a second and third partial module according to an exemplary embodiment of the present invention.

FIG. 7 shows a further exemplary embodiment of the rest module configuration with a second and third partial module. This is also a top view. This exemplary configuration makes clear that the additional partial modules like the third partial module 126 can be slightly displaced compared to the position of the first partial module 101. This configuration also guarantees a direct and separate access to all additional partial modules 122. Thereby the first partial module is located in the electronic bay and the second and third partial modules are located in the cargo compartment. These two areas are spatially divided by the cargo wall (not shown). In order to have for example emergency exit possibilities the inventive module also comprises access to all other possible areas of the aircraft level 125 where the module is fixed.

Figure 8:
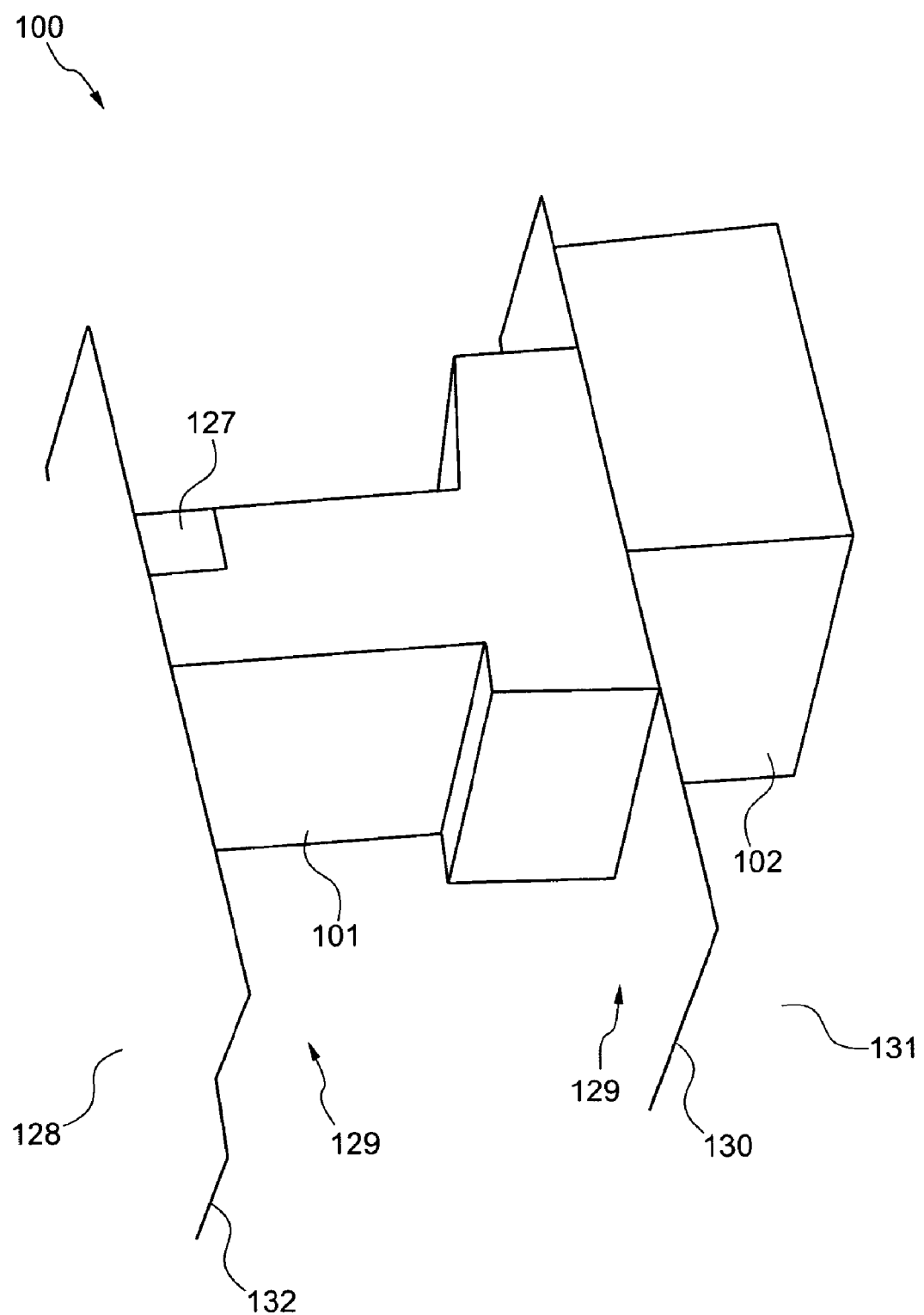
FIG. 8 shows a schematic view of an exemplary embodiment of the rest module with a second partial module according to an exemplary embodiment of the present invention.

FIG. 8 shows a schematic view of a further exemplary embodiment that is installed on the cargo level of an aircraft. On the left-hand side where the area of the nose landing gear 128 starts one can clearly see the separation between the nose landing gear and the electronic bay which separation is marked with 132. The rest module is installed in the area of the electronic bay 129, where normally a lot of electronic devices are situated. The first partial module 101 for example might directly be located and fixed in that electronic bay including its comprised entrance 127. Separated by a cargo wall 130 the second partial module 102 is for example docked on the first partial module 101 and is therefore situated in the spatially separated cargo compartment 131.

An important aspect of this embodiment of the invention is, that the first partial module (101) is permanently fixed in the electronic bay (129), which means before the cargo wall (130) and thus not in the cargo compartment or cargo area (131). This installation has the economically highly relevant consequence that no revenue space has to be used for accommodating crew members, as no cargo space is required in such a base installation without a second partial module (102). As the electronic bay is located close to the nose of the aircraft a second advantage of this installation is generated. Due to higher security standards for the flight crew a special flight crew security region is provided within the aircraft. The installation of the first partial module allows technically to insert the first partial module in such a special flight crew security region. It might thus be possible to build a complete mechanical unit by the shown first partial module and the above located cockpit and maybe further accommodation elements like e.g. lavatories. Thus a short and safe way for the flight crew into the first partial module in the electronic bay can be realized within this security area. The flight crew area is thus adapted in such a way, that a flight crew member does not need to leave this spatially divided and secure flight crew area on his way to the electronic bay (129). Direct and secure access from the cockpit to the first partial module is provided.

In case of a demand for more crew rest space, a second partial module 102 is docked on at the first partial module 101. This second partial module 102 and further partial modules are located behind the cargo wall and thus situated in the cargo area. A docking possibility is to use a cargo door in the cargo wall (130). In addition to those advantages of such a combined crew rest installation in the electronic bay and optionally in the cargo area, still only one common aid in ascending or staircase (see (109) in FIGS. 1 to 5) is used for the permanently fixed first module and all other optional Dock On modules. This staircase (not shown) is situated below the shown entrance 127. Therefore space and weight may be saved by supplying one staircase for people being accommodated in the electronic bay and simultaneously for people being accommodated in the cargo compartment or area 131.

Furthermore, the second partial module 102 may be docked on to the cargo wall 130 in such a way, that an access from the electronic bay 129 through the cargo wall directly into the second partial module is provided. Therefore an opening of the second partial module may cover the surface of the opening of a door in the cargo wall. As can bee seen in FIG. 8 the second partial module may be shifted laterally compared to the first partial module 101.

Figure 9:
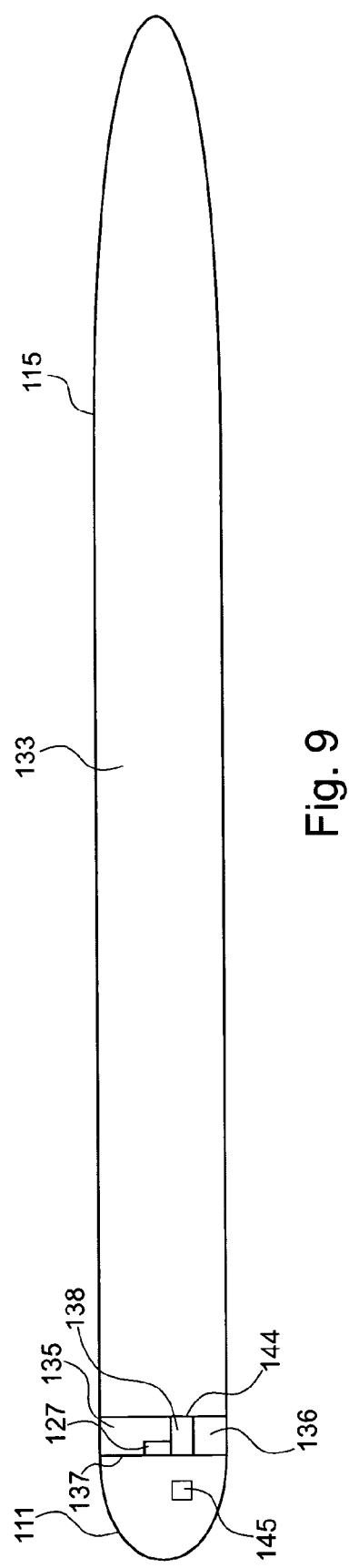
FIG. 9 shows a schematic view of an main deck of an aircraft according to an exemplary embodiment of the present invention.
Figure 10:
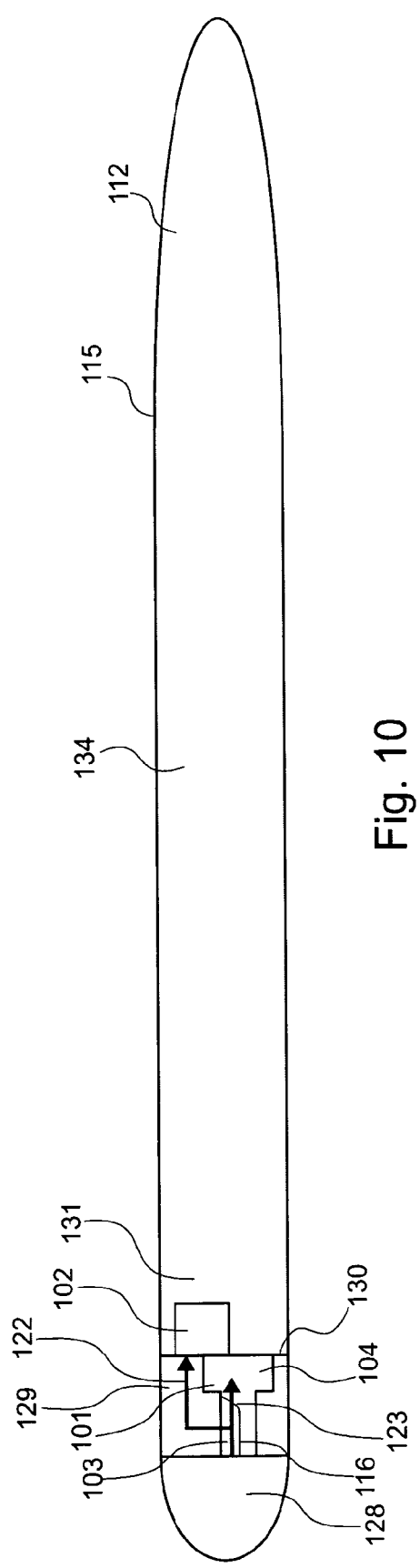
FIG. 10 shows a schematic view of an cargo deck of an aircraft with an exemplary embodiment of the rest module integrated in an airplane according to an exemplary embodiment of the present invention.

Further on FIGS. 9 and 10 show two-dimensional horizontal cross-sections along the longitudinal axis of the aircraft 115. FIG. 9 thereby shows the main deck 133 which is comprising the cockpit area 111 and for example a galley 135 and a lavatory 136. In order to realize a flight crew security area, a second wall 144 before the cockpit corridor 144 may be installed in combination with a rest module according to another embodiment of the invention. If the door in that wall is locked, a secure and direct access through the entrance 127, which is also located in that secure area is provided for the flight crew. A second security enhancement is provided by the cockpit wall 137. Furthermore a direct access 145 from the cockpit itself through a hatch or flap mechanism in the floor of the cockpit may be provided. Therefore a flight crew member may have two secure access possibilities to the rest compartment on the cargo level.

A double security boarder is generated against adversely influences and intrusions, like fire, explosions, gun shots or chemical attacks by means of the two walls 137 and 144. In combination with FIG. 8 one can see, how an entering from the entrance 127 within the cockpit corridor may guide a crew member to the first partial module 101 and the second partial dock on module 102. The cockpit wall of FIG. 9 is further shown in FIG. 11.

As the cockpit wall can be locked, also access for maintenance purposes may be provided though the entrance 127 to the cargo level, without having to make the safe cockpit area unsecure. Thus an additional access for maintenance people may be avoided which may reduce the weight of the aircraft.

FIG. 10 shows a lower deck 134 of an aircraft 115 which lower deck might also be interpreted as the cargo level or cargo deck of the aircraft. The aircraft comprises the area of the nose landing gear 128 behind which the inventive module might be installed. The inventive first section 103 of the first partial module 10,1 which is divided by the separating wall 116 from the second section 104 is shown clearly. This configuration guarantees a separate and direct access to the second partial module 102 which access 122 is indicated by an arrow. The direct and separate access 123 to the second section 104 is also indicated by an arrow. The cargo wall 130 divides the area of the electronic bay 129 from the cargo compartment 131.

As one can clearly see in FIG. 10, the first partial module 101 is fixed in the electronic bay 129 and the second partial module is fixed behind the cargo wall 130 in the cargo compartment 131. Thus in a base installation with only the first partial module no revenue space in the cargo compartment is needed or wasted. Furthermore, in combination with FIG. 9, it can be seen, that a very close access from the cockpit 111 to the module 101 into the electronic bay 129 is realized. A direct access from the cockpit to the electronic bay via e.g. a hatch in the floor of the cockpit is possible. Thus a security region for the flight crew may consist of the cockpit, the first partial module in the electronic bay, access elements like flap mechanisms (shown in FIG. 3, 124), floors and maybe of lavatory elements. It is further shown, that access to both partial modules 101, 102 is provided through the first partial module. Thus, only one aid in ascending like one stair house is needed, which may safe weight and space. In addition to that a mechanical coupling between the cargo level 134 and the floor of the main deck 133 is provided by the one and only stair house of the first partial module. As the first partial module may be fixed to the subshell of the airplane a strong mechanical stability is offered by the module. The module 101 may be screwed to ribs or the frame of the airplane by means of shock mounts. This allows compensating for turbulences and may avoid disturbing acoustic noises. In other words the mechanical coupling between the main deck and the cargo deck and the mechanical stability of that airplane region may be increased by the fixation of the module 101 to the electronic bay floor and the upper mechanical of the module to the floor of the main deck.

Figure 11:
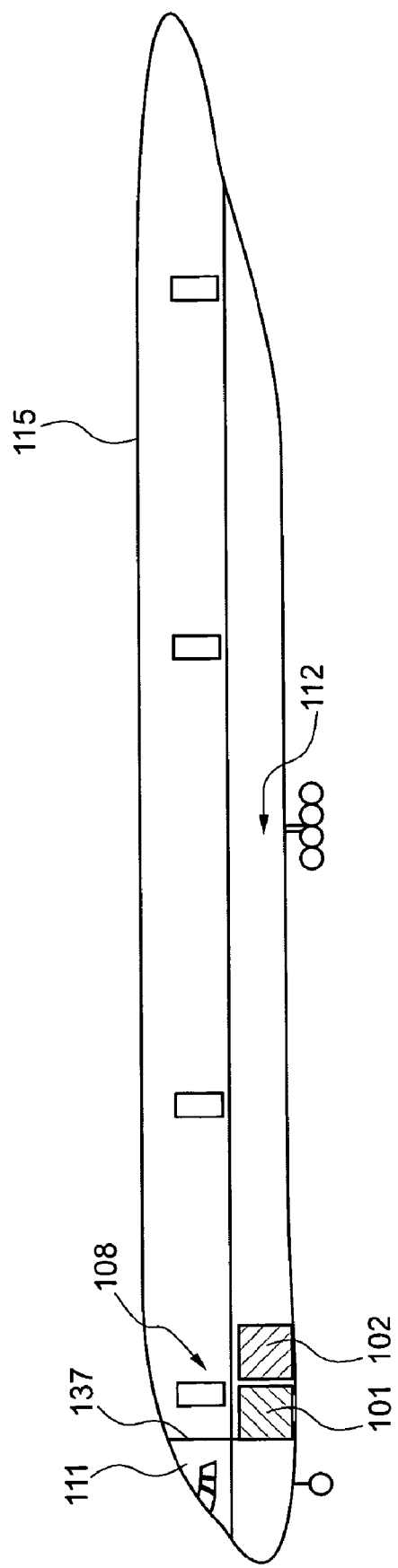
FIG. 11 shows a schematic view of an exemplary embodiment of the rest module integrated on a cargo deck of an aircraft according to an exemplary embodiment of the present invention.

FIG. 11 shows a vertical cross-section along the longitudinal axis of an aircraft 115. Thereby the cargo level 112 is comprising the first partial module 101 and the second partial module 102. The above-located area 108 which is situated above the modules is separated from the cockpit 111 by the cockpit wall 137.

Figure 12:
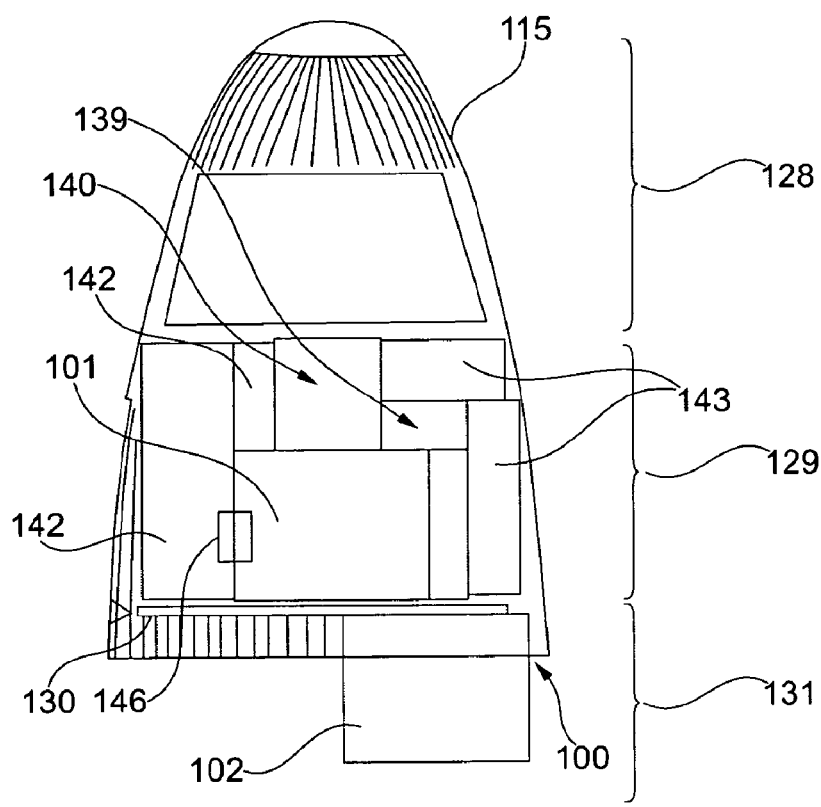
FIG. 12 shows a two-dimensional horizontal cross-section along the longitudinal axis of the aircraft according to an exemplary embodiment of the present invention.

FIG. 12 shows a two-dimensional horizontal cross-section along the longitudinal axis of the aircraft 115. As one can see an access 140 from main deck is provided. This access may be identical in an embodiment of the invention with the entrance 127 shown in other figures.

The first avionic bay 141, which may comprise several elements like e.g. racks or server is shown on the left hand side in an secure and required distance from the second avionic bay 143. The first partial module 101 of the rest module 100 is installed in the e-bay 129 before the cargo wall 130 between the first and second avionic bays. This wall protects the e-bay and the first partial module in for example the case of a rapidly compression.

Thus a beforehand unused space, that may be relatively cheap compared to revenue space in the cargo area is used for accommodating crew members. In other words the two different functionalities cabin and electronics are advantageously combined and the e-bay is securely separated into two partial e-bays by the first partial module. Additionally the walls and the mechanical structure of the first partial module may be arranged in such a way, that the module serves as a protection for both the first and second avionic bays. The rest module may further have a maintenance trap or flap 146 of the first partial module to provide for access to the first avionics bay 142.

A corridor for reaching the second partial module 139 is further shown. This corridor in the e-bay is for the access to the second partial module 102, for the access to the avionic bay 143 and equipment. Covers may be integrated to protect the electronical components of the avionic bay and to protect the crew members. As the landing gear area obeys a limited height it may not be convenient for these accommodating purposes.

Figure 13:
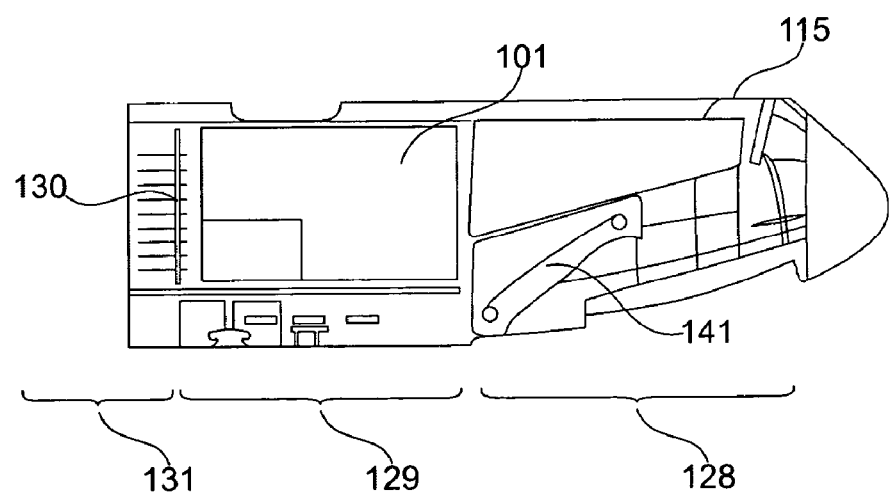
FIG. 13 shows a two-dimensional vertical cross-section along the longitudinal axis of the aircraft according to an exemplary embodiment of the present invention.

FIG. 13 shows a two-dimensional vertical cross-section along the longitudinal axis of the aircraft 115. A clear distinction between the three different areas nose landing gear area 128, e-bay 129 and cargo compartment 131 can be seen. An optional second partial module 102 (not shown) may be installed behind the cargo wall 130 as a cargo container like module in the cargo compartment 131.

It shall be noted, that the term "rest" used in the previous and the following content of this application comprises the meaning of both to remain, to stay, to work, to sleep and to relax. All these activities are possible in the inventive compartment and all apparatuses needed for them may be installed inside the modules.

It should be noted, that the term "comprising" does not exclude other elements or steps and the terms "a" or "an" does not exclude a plurality. Further on elements described in association with different embodiments may be combined.

It should also be noted that reference signs in the claims shall not be construed as limiting the scope of the claims.

LIST OF REFERENCE NUMERALS

100 rest module
101 first partial module
102 second partial module
103 first section
104 second section
105 first opening
106 second opening
107 third opening
108 above-located area of the aircraft
109 aid in ascending
110 sleeping accommodation
111 cockpit
112 cargo level of the aircraft
113 connecting element
114 conventional cargo container
115 aircraft
116 wall
117 door
118 floor of the above-located area of the aircraft
119 level of the rest module
120 opening in the second partial module
121 seat
122 direct and separate access to the second or more additional partial modules
123 direct and separate access to the second section
124 flap mechanism
125 access to all other possible areas of that aircraft level
126 third partial module
127 entrance
128 area of the nose landing gear
129 electronic bay
130 cargo wall
131 cargo compartment
132 separation between nose landing gear and electronic bay
133 main deck
134 lower deck/cargo level
135 galley
136 lavatory
137 cockpit wall
138 cockpit corridor
139 corridor for reaching the second partial module
140 access from main deck/from cockpit corridor
141 box for landing gear
142 first avionic bay
143 second avionic bay
144 second wall before the cockpit corridor
145 direct access from the cockpit to the lower level/cargo level
146 maintenance flap of first partial module

The invention claimed is:

1. An aircraft comprising:
an electronic bay;
a cargo wall; and
a rest module for accommodating at least one crew member of the aircraft, wherein the rest module comprises: a first partial module;
wherein the first partial module comprises a first section and a second section;
wherein the first section and the second section are spatially divided;
wherein the first section comprises a first opening, a second opening and a third opening;
wherein the first, second, and third openings are different from each other;
wherein the first opening is adapted for providing an access from the upper area of the aircraft;
wherein the second opening is adapted for providing an access from the first section to a second partial module;
wherein the third opening is adapted for providing a separate access from the first section to the second section;
wherein the first partial module having a sleeping accommodation, is permanently fixed in the electronic bay before the cargo wall of the aircraft.

2. An aircraft according to claim 1,
wherein the second partial module is located behind the cargo wall.

3. An aircraft according to claim 2, wherein the first and the second partial modules are adapted for being mounted on a cargo level of the aircraft.

4. An aircraft according to claim 1, wherein the electronic bay comprises a first avionic bay and a second avionic bay; and
wherein the first partial module is installed between the first avionic bay and the second avionic bay.

5. An aircraft according to claim 4, wherein a housing of the first partial module is constructed in such a way, that it is used as a protection element between the first avionic bay and the second avionic bay.

6. An aircraft according to claim 1, wherein the first partial module is adapted for docking on the second partial module.

7. An aircraft according to claim 1, further comprising a connecting element;
wherein the connecting element is adapted for docking on the second partial module at the first partial module or at the cargo wall.

8. An aircraft according to claim 1, wherein the upper area of of the aircraft is a cockpit of the aircraft.

9. An aircraft according to claim 1, wherein each of the partial modules comprises a sleeping accommodation.

10. An aircraft according to claim 1, wherein the first section comprises an aid in ascending.

11. An aircraft according to claim 1, wherein the first module comprises an integrated staircase.

12. An aircraft according to claim 1, further comprising:
at least one additional partial module;
wherein the second opening is further adapted for providing an access from the first section to the at least one additional partial module.

13. An aircraft according to claim 1, wherein at least one of the partial modules is shaped as a cargo container.

14. An aircraft according to claim 1, wherein the first partial module is part of a flight crew security area.

15. An aircraft according to claim 14, wherein the flight crew security area is a complete mechanical unit comprising:
the first partial module, and
a cockpit;
wherein the flight crew security area is adapted in such a way, that direct and secure access from the cockpit to the first partial module is provided.

* * * * *

UNITED STATES PATENT AND TRADEMARK OFFICE
CERTIFICATE OF CORRECTION

PATENT NO.        : 8,162,258 B2
APPLICATION NO.   : 12/743645
DATED             : April 24, 2012
INVENTOR(S)       : Gilles Joannis et al.

It is certified that error appears in the above-identified patent and that said Letters Patent is hereby corrected as shown below:

In the Claims:

Col. 14, Line 40, delete "," before "is permanently fixed".

Col. 14, Line 65, delete "of" before "the aircraft".

Signed and Sealed this
Second Day of July, 2013

Teresa Stanek Rea
*Acting Director of the United States Patent and Trademark Office*